Dec. 8, 1959     C. E. RICKARD     2,916,043
DRAIN GASKET

Filed Nov. 13, 1958     2 Sheets-Sheet 1

INVENTOR.
Clyde E. Rickard
BY Green, McCallister & Miller
HIS ATTORNEYS

Dec. 8, 1959   C. E. RICKARD   2,916,043
DRAIN GASKET
Filed Nov. 13, 1958   2 Sheets-Sheet 2

INVENTOR.
Clyde E. Rickard
BY
HIS ATTORNEYS

United States Patent Office 2,916,043
Patented Dec. 8, 1959

2,916,043

DRAIN GASKET

Clyde E. Rickard, Pittsburgh, Pa., assignor to McDowell Manufacturing Company, Millvale, Pa., a corporation of Pennsylvania Application November 13, 1958, Serial No. 773,716

10 Claims. (Cl. 137—217)

This invention relates to a drain gasket coupling system for fluid conduits and more particularly, to a pressure sealing drain gasket for use in pipe lines which drains liquids from the pipe line along the extent of the gasket, while simultaneously permitting an ingress of air within the pipe line to replace the volume of drained liquid, when fluid pressure is relieved from the pipe line, and which further permits the venting of the air from the pipe line when fluid pressure is again applied and before the gasket completes its pressure-responsive sealing action.

I have found that it is necessary when draining pipe sections to provide a relief or drain portion immediately adjacent the section to be drained, rather than from a point remote therefrom, such as the end of a pipe line. Therefore, it appeared advisable to provide a means which not only can be utilized to seal-off individual pipe sections at their joints, but which also can be used as a means for draining the pipe sections at their respective coupling ends. In addition, I have found that it is not only necessary to provide a means for draining the pipe, but in order to avoid creating a vacuum therein, resulting in a minimum of drainage, it is also necessary to provide a venting means, so that the volumetric liquid portion removed therefrom will simultaneously be replaced with a gaseous volume. By incorporating this concept in my improved drain gasket, I am able to completely drain the pipe sections without creating a negative pressure within the pipe line.

This drainage is particularly important within irrigation systems wherein it is customary to run a plurality of temporary lateral lines off more permanent feeder lines. After the area covered by the lateral lines has been thoroughly supplied with water, fluid pressure within the feeder lines is turned-off and the lateral lines removed and transported to a new position. It is necessary that the lateral lines be drained before the couplings can be disassembled, since the fluid pressure within the lines tends to hold the couplings together. In addition, it is advisable to drain these lateral lines to reduce the weight thereof when moving them from one position to another, and also to reduce the spillage which would otherwise be produced if they were allowed to drain during transportation.

When the lateral lines are connected to the feeder lines at their new positions, it is necessary that the air within the lines be removed, or otherwise the entrapped air will cause a spitting at the spray heads and line surges which, under some conditions, may tend to recede the holding action of the coupled section. Therefore, I have devised a new drain gasket which selectively seals-off around its circumference as fluid pressure is applied therethrough, while permitting the air within the pipe line to escape and be vented therefrom as the fluid pressure builds up. When the fluid pressure has reached a predetermined amount, the entire gasket will then be completely sealed-off and the air completely vented from the pipe line.

In the past, I designed a gasket valve for venting pipe sections which operated by the movement of a flexible heel or back flap portion, as shown in my Patent No. 2,730,116, issued January 10, 1956. Although this gasket was a step forward, and an advance over the prior art, the operational movement of the back flap is dependent upon the position and movement of the coil spring within the coupling. Since the coil spring is utilized in the coupling as a binding device and held therein in a frictional engagement, it is not particularly sensitive to changes in fluid pressure. Therefore, the gasket valve, as disclosed in the aforementioned patent, is not always responsively operable, especially since the spring coil has a tendency to stick and occasionally fails to back off when fluid pressure is relieved. As a result, when this happens, the back flap portion cannot be flexed open and therefore, the gasket valve does not drain. In addition, the slit passageway utilized in this flexible heel type of gasket valve has a tendency to become clogged with troublesome sand, grass, etc., and due to its operational configuration, it is difficult to clean out. Once clogged, the gasket remains in such a state, and even when the coupling is taken apart, the gasket may not automatically free itself from the foreign material, but may have to be specially cleaned. I have therefore devised my new and improved drain gasket which is operable and functions independently of the coil springs and relies solely upon fluid pressure acting within its fluid pressure chamber. Furthermore, the functional configuration is constructed so that when the coupling is taken apart, the gasket will automatically free itself of foreign matter, should it become clogged.

In addition, I had previously conceived of the idea of using drain slots formed in the forward face of a drain gasket to drain the coupled sections. The sole use of these drain slots proved very successful in the irrigation field when they were used in pipe lines laid on level ground. However, when the irrigating pipe lines were utilized on rolling or hilly ground, the drain slots in the gaskets forming the couplings at the bottom of the hill may fail to open, due to the hydrostatic pressure of the water retained in the lines running up the side of the hill. Normally, these drain slots will open when the line pressure is diminished to about 5 to 10 p.s.i.; however, since the hydrostatic pressure within the pipe line exerts a greater amount of pressure on the couplings, the drain slots become somewhat inoperative when utilized in hilly and rolling terrain.

Therefore, I have devised my new and improved drain gasket which incorporates the use of drain holes independently of or in cooperation with drain slots, which holes may be designed to open at a line pressure of about 20 pounds per square inch. With the gasket opening at such a pressure, the couplings are capable of draining the pipe sections at the bottom of a hilly terrain, even though they may be under a hydrostatic pressure up to about 20 p.s.i. It is to be understood, of course, that the size of the holes and the spacing thereof may be varied, so as to produce a drain gasket which will open at any desired line pressure in order to fit any particular need.

It has thus been an object of my invention to provide an improved system for air-pressure normalizing and draining a pipe line having a plurality of coupled sections.

Another object of my invention has been to solve the problem heretofore presented in the art by conventional and known valve constructions utilized in connection with pipe sections.

A further object of my invention has been to develop an improved drain valve construction which will operate effectively in a peripheral manner about and in cooperation with the joint between a pair of coupled line pipe sections, independently of the pressure of and the coupling medium used to lock the pipes in an assembled position.

A still further object of my invention has been to devise an automatic relief and drain valve of simple construction functionally operable solely in response to fluid pressure within the pipe line in which it is incorporated.

An additional object of my invention has been to provide a drain gasket which will be self-sealing under line pressure, but which will automatically open when line pressure is removed although the gasket may be subject to hydrostatic pressure.

These and other objects will be apparent to those skilled in the art from the following disclosure and drawings in which.

Figure 1:
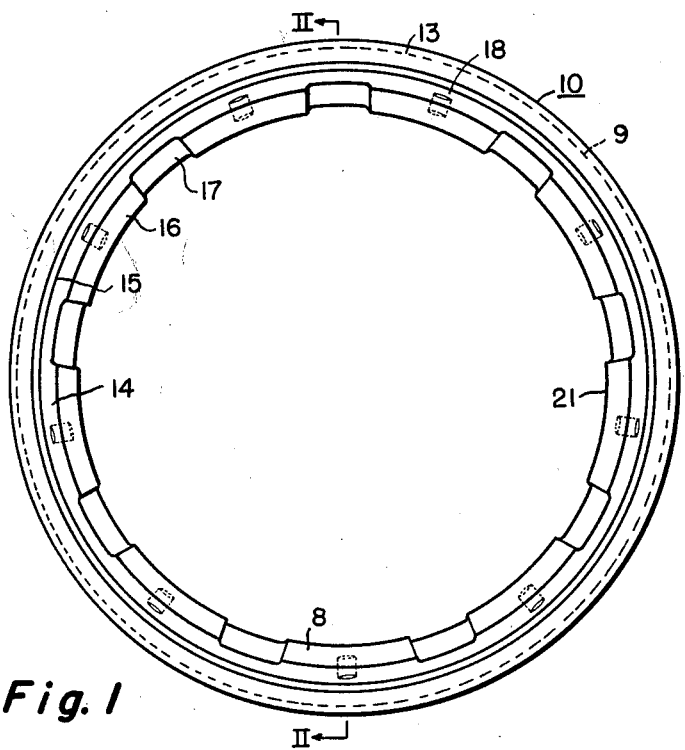
Figure 1 is a plan view of a gasket incorporating the novel substance of my invention.
Figure 2:
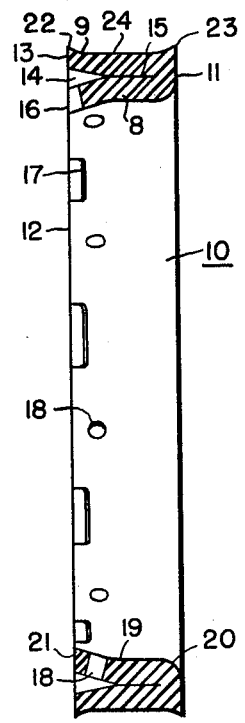
Figure 2 is a side elevational view in section taken along lines II—II of Figure 1.

Referring now to the drawings and particularly to Figures 1 and 2, my improved gasket comprises, an annular gasket 10 made of any resilient or flexible material, such as flexible plastics and natural or synthetic rubber. The gasket 10 has a unitary back wall, ring abutment or base surface 11 and a forward bifurcated face part 12. Inner wing portion 8 and outer wing portion 9 form the opposed legs of the bifurcated face part 12. The bifurcated face part 12 comprises an outer or front abutting face 13 on wing portion 9, and an inner front face 16 on wing portion 8. An annular fluid-pressure-responsive chamber 14 is formed within the gasket 10 between the two wing portions, opening forwardly between the forward faces and terminates rearwardly into a narrow annular slit 15 which extends backwardly through the gasket to a point spaced from the back wall 11. The rearwardly-extending slit 15 increases the effectiveness of the pressure-responsive-chamber in expanding-out the wing portions 8 and 9 to provide excellent sealing when fluid pressure is applied to the line, without decreasing the necessary structural stability of the wing portions.

The radially-inner front face 16 is provided with a plurality of peripheral or arcuate equally spaced-apart drain slots 17. The drain slots 17, when in an open position, communicate with the fluid pressure chamber 14 and the inner periphery of the gasket 10. A plurality of sloped, radially-extending arcuately spaced-apart drain hole portions 18 are formed within the inner wing 8 and are rearwardly and arcuately offset with respect to the slots 17. When in an open position, the drain holes 18 communicate with the pressure chamber 14 and the inner periphery of the gasket 10, to provide a free and open passageway therebetween.

The inner wing portion 8 comprises an inner peripheral wall 19 which terminates into a rounded-edge back portion 20, continuous with the back or base wall 11, and a radially inwardly-turned or flexed sealing lip portion 21 adjacent the forward face 16. The outer wing portion 9 is provided with an outer peripheral concave surface or suction chamber 24 which terminates in a forward sealing lip edge 22 adjacent forward face 13 and a rearward sealing lip edge 23 adjacent the back wall 11.

The lips 22 and 23 are of a tough, heavy (resilient) construction and cooperate with the concave surface 24 to provide an operable sealing engagement with an inner sealing surface of an outer coupling member. It has been found that sand, dirt, and other foreign matter work their way into the couplings, especially when used for irrigating lines, and it is necessary that a heavy lip edge be used, since it will shove up through the dirt and provide an operable seal, whereas a thin lip gasket cannot provide a satisfactory fluid-tight seal under field conditions. In addition, I have found that the double rim sealing effect provided by the use of outer lips 22 and 23 cooperating with the concave portion 24 provides a fluid-tight suction-fit seal which is operable under negative or sub-atmospheric pressures. This type of seal, therefore, materially reduces or eliminates the ingress of foreign material between the outer periphery of the gasket and the adjacent cooperative sealing surface of the coupling, even although the line be subject to a momentary sub-atmospheric pressure, such as when a liquid column falls upon the termination of pump or line pressure.

Figure 3:
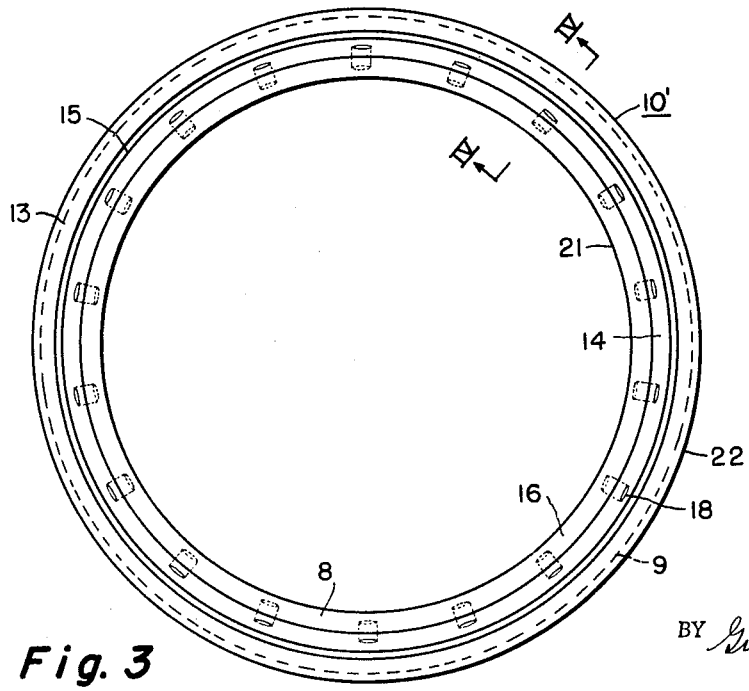
Figure 3 is a plan view of another embodiment of my invention similar to Figure 1, but wherein the drain slots of Figure 1 have been eliminated.
Figure 4:
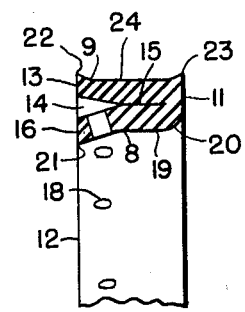
Figure 4 is a sectional fragmental view in elevation taken along lines IV—IV of Figure 3.

Figures 3 and 4 illustrate a gasket similar in all respects to the gasket of Figures 1 and 2, with like numbers illustrating corresponding illustrated like parts, with the exception that the embodiment of Figures 3 and 4 does not incorporate the use of drain slots 17. As illustrated in Figure 3, the gasket 10' has a plurality of arcuately spaced-apart drain holes 18 formed within the inner wing portion 8 and does not employ drain slots 17 illustrated in the gasket 10 of Figure 1. The basic operation of gasket 10' is similar to that of gasket 10, except that the elimination of the drain slots 17 and the incorporation of the added drain holes 18 tend to make the gasket 10' open at a higher pressure than the gasket 10. This higher-pressure opening is extremely useful in a drain gasket where it is subject to high hydrostatic pressures, such as where the coupling is lying in a valley and the pipe line extends over an adjoining hill. However, for lower pressures, the gasket 10 will give more sensitive action, since first, the holes 18 will open at a pre-determined pressure of about 20 p.s.i., and then the slots 17 will open when the pressure is further diminished, down to about 5 to 10 p.s.i., to thus give an efficient and quick drainage.

Figure 5:
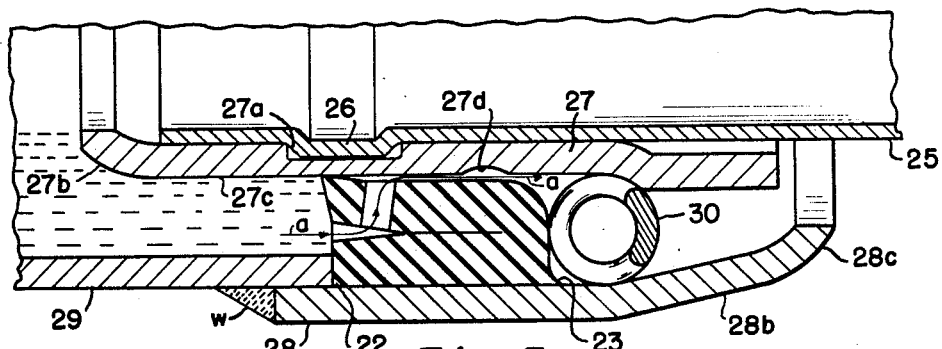
Figure 5 is a sectional fragmental view in elevation showing a lower portion of a drain gasket embodying my invention in an open or draining position within a pipe coupling.
Figure 5A:
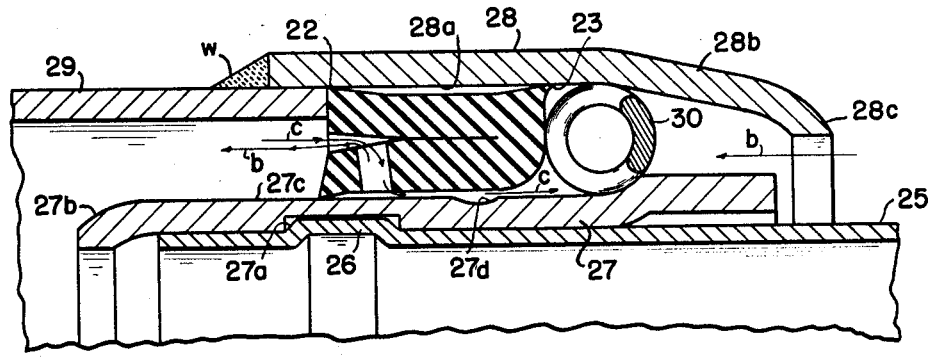
Figure 5A is a fragmental side elevational view in section similar to Figure 5, but showing an upper portion of the drain gasket when in an open or air venting position.
Figure 6:
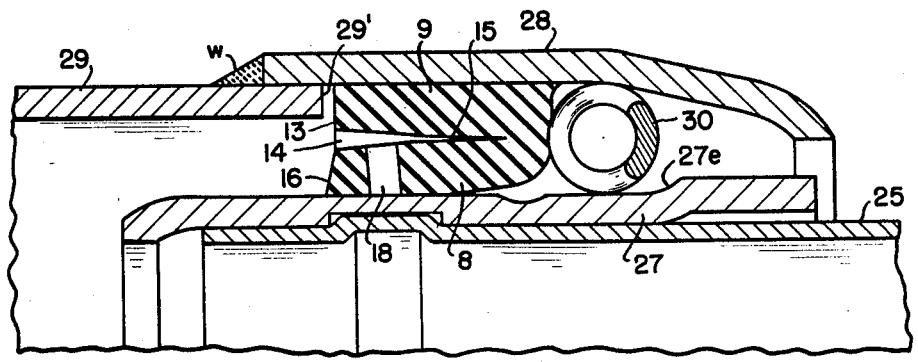
Figure 6 is a fragmental side elevation in section similar to Figure 5A, but showing the gasket in a sealed or closed-off position.

Figures 5, 5A and 6 show a gasket incorporating my new and improved construction assembled within a pipe coupling. Figure 5 illustrates the position of the gasket when line pressure has been removed from the pipe line and the gasket is in a flexed position for draining the pipe, and the outward flow of liquid therethrough, as shown by arrows a. Figure 5A shows an upper portion of the gasket when the pipe is being drained and illustrates the path of the incoming atmosphere by arrows b. In addition, the upper portion of the gasket will be in this same position for venting the pipe line when line pressure is initially applied or restored to the pipe line. Figure 5A also illustrates this venting of the pipe line by arrows c. When the fluid pressure within the line reaches a pre-determined amount, the pipe line will have been completely vented and the gasket will be sealed around its entire periphery, as shown in Figure 6.

The coupling has a pipe or conduit member 25 having a nose member 27 secured thereto by means of a rolled-out portion 26 on the pipe member 25 which engages a recessed portion 27a formed in the nose member 27. The nose member comprises a forward abutting nose end flange 27b, a cylindrical seating or sealing surface 27c, a safety catch recess 27d for a retainer coil, and an offset abutment shoulder 27e. A coupling body part 28 may be secured to a housing body member 29 by means of a weld w. The housing body member 29 has an abutment end or edge 29' against which the forward abutting face 13 of the gasket is positioned when inserted into the coupling. The housing body member 29 is secured to an end of a pipe member to be mounted (not shown) in a similar manner as the nose member 27 is secured to pipe 25. The coupling body part comprises a peripheral seating or sealing surface 28a for the outer periphery of the gasket, a cone-shaped throat portion 28b, and an end lip or flange 28c. An annular grip, retainer or latch coil 30 is operably positioned between the coupling body part 28 and the nose member 27.

My new form of drain gasket may be manufactured by molding the annular ring without the slit 15 or drain holes 18 formed therein. The slit 15 may be formed by placing the molded gasket on a mandrel or drill press head. A knife blade is then moved downwardly into the gasket and rotated arcuately thereabout to produce the annular slit at the base of the pressure-responsive chamber. The slit is thus produced, so that the wing portions are in a normally closed-together position along the slit, whereas if the slit were molded into the gasket, the wings would have a tendency to spread apart or be expanded in their normal position and thereby produce an inoperative gasket.

The holes 18 may be produced within the wing member 8 by drilling, rather than by punching. By drilling the holes 18, I have been able to produce and maintain more accurate dimensions and spacings than obtainable by punching. An annular stop rim is set in place within the slit 15 to limit the cut of the drill. I have found that although the drilling operations may be performed dry, optimum results are obtained by using water when slitting or cutting the gasket.

In operation, the gasket is inserted within the coupling body part 28, so that the front abutting surface 11 contacts the abutment end 29'. The annular grip or retaining coil 30 is then inserted within the coupling body part. The nose member 27 may then be slid within the coupling body part, so that the coil 30 and annular gasket are positioned therebetween. The rounded back portion 20 of the gasket permits an easy slidable insertion of the nose member within the housing body part. When so positioned, the outer forward sealing lip 22 and rearward sealing lip 23 contact the peripheral sealing surface 28a, and the inwardly-turned sealing lip portion 21 is compressibly retained against the cylindrical sealing surface 27c, see Figures 5 and 5A.

When fluid pressure is initially applied to the assembled coupling, the bottom portion of the gasket beneath the level of the applied liquid will be sealed-off, due to fluid pressure within the pressure-responsive chamber 14 and slit 15, and the top portion of the gasket will remain open momentarily, in order to vent and expel the gases within the line, as shown by the arrows c in Figure 5A. The gasket will seal upwardly as the liquid raises in the conduit, until a pre-determined full pressure is applied thereto, wherein the gasket will be completely sealed about its entire periphery, due to fluid pressure acting within the pressure-responsive chamber 14 and the slit 15 to expand the wing portions 8 and 9 outwardly, as shown in Figure 6. The slit 15 acts to extend the fluid-pressure-responsive chamber 14 backwardly into the gasket and permits sealing, even when the coupling members are angularly offset.

When it is desired to disconnect the pipe members, such as for transporting them from one irrigation area to another, line pressure within the conduit system is turned off. As a result, line pressure is relieved from acting on the fluid-pressure-responsive chamber 14 and slit 15, and accordingly, the wing portions are allowed to contract back to their normal positions, due to the resiliency of the gasket. The inner peripheral wall of the gasket 19 will then become disengaged from the cylindrical sealing surface 27c, thereby allowing fluid passage through the drain holes 18. While the drain holes 18 at the bottom of the gasket are discharging water therethrough, the drain holes near the top of the gasket will be venting air inwardly to replace the volume of water discharged to thereby permit free and complete drainage of the conduit. Since the drain holes 18 are spaced inwardly from the forward edge 16 of wing member 8, the holes will open and allow drainage after line pressure has been deleted, even although the system may be under hydrostatic pressure. The pressure at which the gasket will open may be varied by increasing or decreasing the size of the holes 18 and/or the placement and number of holes employed. When the size of the holes or number of holes is increased, the pressure at which the gasket will open accordingly will be increased, and this may be varied to suit a particular need, as desired.

It will be apparent that while I have illustrated two embodiments of my invention, modifications may be made, without departing from the spirit of the invention, as set forth in the accompanying claims.

What I claim is:

1. An annular drain gasket for use in coupling along a fluid conduit system comprising, a unitary back wall part, a bifurcated front part forming inner and outer wing portions, a fluid-pressure-responsive chamber formed between said wing portions and opening forwardly into said front part, an annular slit communicating with a back end portion of said fluid-pressure-responsive chamber and extending backwardly into said gasket between said wing portions, a plurality of arcuately spaced-apart drain hole portions formed radially through said inner wing portion intermediate said back and front parts, and said drain hole portions communicating with the fluid-pressure-responsive chamber and the inner periphery of said annular gasket.

2. An annular drain gasket for use in coupling of an irrigation line comprising, a unitary back wall part, a bifurcated front wall part comprising an outer front abutting surface and an inner front wall face, inner and outer wing portions formed backwardly of said front wall part and joined unitarily adjacent said back wall part, a fluid-pressure-responsive chamber formed between said wing portions and forwardly open adjacent said front wall part and terminating at its back end into an annular slit, the annular slit extending backwardly within said gasket and terminating adjacent said back wall part, a plurality of arcuately spaced-apart drain hole portions formed within said inner wing portion backwardly offset from said front wall part, said drain hole portions communicating with said fluid-pressure-responsive chamber and the inner periphery of said gasket when the gasket is in an open position within a coupling.

3. A drain gasket operatively responsive to changes in fluid pressure for use in couplings along a pipe line comprising, a resilient annular body having a unitary back wall, a bifurcated front wall having a front outer surface and a front inner surface, a fluid-pressure-responsive chamber opening forwardly between said front surfaces and extending backwardly into the gasket, an annular slit formed within said gasket and communicating with a back end portion of said fluid-pressure-responsive chamber, inner and outer wing portions formed adjacent to and radially-inwardly and radially-outwardly, respectively of said slit, a plurality of arcuately spaced-apart drain slots formed in the forward face of said front inner surface and communicating with said fluid-pressure-responsive chamber and the inner periphery of said gasket, and at least one drain hole portion formed radially through said inner wing portion backwardly-offset from said drain slot and communicating between said fluid-pressure-responsive chamber and the inner periphery of said gasket.

4. In an annular joint spacing defined between a pair of detachably coupled pipe sections, an improved valve construction for selectively draining and sealing-off fluid flow therebetween which comprises, an annular drain gasket, said gasket having a pair of radially inner and outer spaced-apart side wing portions to abut opposed portions of the pipe sections, said side wing portions terminating rearwardly into a unitary back wall portion, said outer side wing portion having a front abutting surface, said inner side wing portion having a radially-inner front surface, a fluid-pressure-responsive chamber formed between said side wing portions and opening forwardly adjacent said front surfaces, an annular slit communicating with an end portion of said fluid-pressure-responsive chamber and terminating rearwardly adjacent said unitary back wall portion, and a plurality of drain portions formed in said inner wing portion for communication with said fluid-pressure-responsive chamber and the inner periphery of said gasket for draining and venting the coupled pipe sections when line pressure is released therefrom.

5. An improved valve construction to be operatively positioned in an annular joint spacing defined between a pair of detachably coupled pipe sections and selectively drain and seal-off fluid flow therebetween which comprises, a resilient drain gasket of annular configuration, said gasket having a unitary back wall and a pair of forwardly-extending inner and outer side wing portions connected thereto, an extended fluid-pressure-responsive chamber formed between said side wing portions opening in a forward wall of said gasket, inner and outer peripheral sealing surfaces for operable sealing engagement with the coupled pipe sections, a plurality of drain hole portions formed in said inner wing portion intermediate its ends and communicating with said fluid-pressure-responsive chamber and the inner periphery of said gasket when line pressure is released from the pipe sections to provide draining and venting passageways for rapid drainage of the pipe sections, and said drain hole portions communicating with the fluid-pressure-responsive chamber and a seating surface of an inner pipe section when the pipe sections are under line pressure to seal-off fluid flow therebetween.

6. An improved valve construction as defined in claim 5 wherein said outer peripheral sealing surface comprises, a pair of heavy lip portions adjacent forward and rearward ends of the gasket and a concave surface therebetween which is expanded outwardly against a seating surface of an outer pipe section to form a suction-type sealing engagement therewith when the outer wing portion is expanded outwardly in response to line pressure acting within the fluid-pressure-responsive chamber.

7. In a coupling construction having a nose member secured to an end of one pipe member to be coupled and a coupling body part secured to an end of another pipe member to be coupled, wherein the coupling body part has an inner seating surface and the nose member has an outer seating surface in radial alignment with one another when the nose member is operatively coupled within the coupling body part, a drain gasket positioned between said coupling body part and said nose member comprising, a unitary back wall and a pair of side wing portions extending forwardly therefrom, a fluid-pressure-responsive chamber terminating into a narrow slit formed between said side wing portions and opening through a forward face of the gasket, inner and outer peripheral sealing surfaces on said gasket for operable sealing engagement with the seating surfaces of said nose member and said coupling body part, respectively, at least one drain hole portion formed within said inner wing portion intermediate the ends thereof and communicating with the fluid-pressure-responsive chamber, the chamber being responsive to line pressure within the pipe member to expand said wing portions outwardly, so that the inner and outer peripheral sealing surfaces of the gasket are in an operable sealing engagement with their respective seating surfaces to close-off fluid flow through said drain hole portion and seal the coupling.

8. In a coupling construction as defined in claim 7 wherein said wing portions contract inwardly of the fluid-pressure-responsive chamber, due to the resiliency of the gasket upon the release of line pressure within the fluid-pressure-responsive chamber although subject to hydrostatic pressure, so that said drain hole portion forms an open passageway with the inner periphery of said gasket for draining and venting the pipe line.

9. In a coupling construction as defined in claim 7 wherein said outer peripheral sealing surface comprises a pair of heavy lip portions adjacent front and back end portions of the gasket and a concave recessed portion formed therebetween, said recessed portion being expandable outwardly by the outer wing portion upon the application of fluid pressure to the fluid-pressure-responsive chamber to provide a suction type sealing engagement with the seating surface of the coupling body part which is operable under both positive and negative pressures within the pipe line.

10. In a coupling construction as defined in claim 7 wherein a plurality of drain slots are formed within the forward face of said inner wing member and communicate with an inner periphery of said gasket when fluid pressure is released within the pipe members.

No references cited.

UNITED STATES PATENT OFFICE

CERTIFICATE OF CORRECTION

Patent No. 2,916,043                      December 8, 1959

Clyde E. Rickard

It is hereby certified that error appears in the printed specification of the above numbered patent requiring correction and that the said Letters Patent should read as corrected below.

Column 4, line 42, for "valey" read -- valley --; column 6, lines 22 and 36, for "coupling" read -- couplings --.

Signed and sealed this 10th day of May 1960.

(SEAL)
Attest:
KARL H. AXLINE
Attesting Officer

ROBERT C. WATSON
Commissioner of Patents